United States Patent [19]

Oosaki et al.

[11] Patent Number: 5,689,173
[45] Date of Patent: Nov. 18, 1997

[54] BATTERY PACK

[75] Inventors: Kazuo Oosaki, Mihara-gun; Takamasa Yamazoe, Sumoto, both of Japan

[73] Assignee: Sanyo Electric Co., Ltd., Osaka, Japan

[21] Appl. No.: 638,856

[22] Filed: Apr. 29, 1996

Related U.S. Application Data

[63] Continuation of Ser. No. 386,054, Feb. 7, 1995, abandoned.

[51] Int. Cl.$^6$ ............... H02J 7/04; H02J 7/06; H01M 10/50; H01M 2/10
[52] U.S. Cl. ............... 320/35; 320/2; 429/62; 429/91
[58] Field of Search ............... 320/2, 20, 35, 320/30; 429/61, 62, 99, 100; D13/103

[56] References Cited

U.S. PATENT DOCUMENTS

| | | | |
|---|---|---|---|
| 3,457,489 | 7/1969 | Gentry, Jr. et al. | 320/22 |
| 3,629,765 | 12/1971 | Hanson | 337/103 |
| 3,900,783 | 8/1975 | Herzog et al. | 320/2 |
| 4,224,383 | 9/1980 | Taylor | 429/7 |
| 4,513,238 | 4/1985 | Orban | 320/23 |
| 4,712,055 | 12/1987 | Houser, Jr. | 320/35 |
| 4,829,226 | 5/1989 | Nakamura et al. | 320/35 |
| 5,150,033 | 9/1992 | Conway | 320/51 |
| 5,248,927 | 9/1993 | Takei et al. | 320/2 |
| 5,254,933 | 10/1993 | Lin | 320/35 |
| 5,466,545 | 11/1995 | Chamberlain et al. | 429/99 |
| 5,585,710 | 12/1996 | Nakamura et al. | 320/15 |

FOREIGN PATENT DOCUMENTS

| | | | |
|---|---|---|---|
| 507569 | 10/1992 | European Pat. Off. | 320/35 |
| A-0545747 | 6/1993 | European Pat. Off. . | |
| A-0676786 | 10/1995 | European Pat. Off. . | |
| A-2003705 | 11/1969 | France . | |
| A-2608323 | 6/1988 | France . | |
| A-2613870 | 10/1988 | France . | |
| 26 43 903 | 3/1978 | Germany | H01M 10/50 |
| U-84118385 | 7/1984 | Germany . | |
| 31 44 858 | 1/1985 | Germany | H02H 7/18 |
| U-87030497 | 5/1987 | Germany . | |
| 36 20 041 | 12/1987 | Germany | H01M 10/50 |
| A-3742088 | 6/1989 | Germany . | |
| 42 34 231 | 4/1994 | Germany | H01M 10/48 |
| 56-69777 | 6/1981 | Japan | 320/35 |
| 63-23885 | 6/1988 | Japan . | |
| 1-126135 | 5/1989 | Japan | 320/35 |
| 2-237437 | 9/1990 | Japan | 320/35 |
| 4-99335 | 8/1992 | Japan . | |
| 4-271234 | 9/1992 | Japan | 320/35 |
| 2042789 | 9/1980 | United Kingdom | 320/35 |
| 2061643 | 5/1981 | United Kingdom | 320/35 |
| A-2088158 | 6/1982 | United Kingdom . | |
| WO-A-9323887 | 11/1993 | WIPO . | |

OTHER PUBLICATIONS

Battery-Tech Inc Battery pack catalog (pp. 1 & 14), May '92.

*Primary Examiner*—Robert Nappi
*Attorney, Agent, or Firm*—Wenderoth, Lind & Ponack

[57] ABSTRACT

The dangers of excessive battery current and battery heating are effectively prevented by maintaining a heat sensitive cut-off device in the cut-off state as long as an over-current situation exists. An inside case positioned in the enclosed space between the batteries and the outside shell houses both the cut-off device and a parallel connected heating resistor. Double insulation allows the heating resistor to efficiently transfer Joule heat to the adjacent cut-off device. Effective use of space and heat transfer properties also reduces post-cut-off battery current and results in no battery pack volume increase.

7 Claims, 13 Drawing Sheets

BATTERY PACK

This application is a Continuation of now abandoned application Ser. No. 08/386,054, filed Feb. 7, 1995 now abandoned.

BACKGROUND OF THE INVENTION

This invention relates to a battery pack containing a heat sensitive cut-off device that cuts off current when excessive current flows or when battery temperature rises abnormally.

As shown in FIG. 1, prior art battery packs contain a thermostat as a heat sensitive cut-off device 11. As shown in the circuit diagram of FIG. 2, the heat sensitive cut-off device 21 which is a thermostat is connected in series with the batteries 2B and the charging terminal 22. The thermostat is a safety device which switches to an off state to stop charging when a battery is overcharged and temperature rises. Although the thermostat switches off and current is cut-off when battery temperature rises during charging, the thermostat switches back on because temperature drops when the current is cut-off. This has the drawback that charging current again flows when battery temperature drops, and the batteries become over-charged.

To avoid this problem, a battery pack has been developed, as shown in FIG. 3, containing a safety device 3A with a heating resistor 33 connected in parallel with the heat sensitive cut-off device 31 which is a thermostat. Since the heating resistor 33 of this battery pack is connected in series with the batteries 3B as shown in the circuit diagram of FIG. 3, current is bypassed through the heating resistor 33 when the thermostat switches off. As shown in FIG. 4, the heating resistor 43 is closely coupled to the heat sensitive cut-off device 41 which is the thermostat. Bypass current that flows through the heating resistor 43 results in Joule heating which heats the thermostat and prevents it from returning to the on state. FIG. 5 is a battery pack having the circuit diagram shown in FIG. 3. FIG. 5 shows safety device 5A mounted on the surface of a battery 5B. FIG. 6 is a plan view, front view, and bottom view of the safety device shown mounted on the battery pack of FIG. 5. As shown in FIG. 6, the heating resistor 83 is fixed in close contact with the surface of the heat sensitive cut-off device 61.

Therefore, this configuration of battery pack containing a safety device can prevent battery over-charging due to the thermostat switching back on resulting in resumption of charging after battery temperature has risen and caused thermostat activation to the off state. However, in this type of battery pack, charging current cannot be reduced to zero even when the thermostat is switched off. This is because current flowing through the heating resistor also flows to the batteries.

Joule heating of a resistor increases in proportion to the square of the current times the resistance. It is necessary to reduce battery current to avoid over-charging, and it is also necessary to increase heating resistor resistance to increase Joule heating. However, in practice Joule heating decreases when the heating resistor is made fairly large. This is because the voltage supplied to a battery pack from a battery charger is limited and, therefore, current drops as resistance increases. In terms of the voltage supplied from the battery charger, Joule heating of the heating resistor increases in proportion to the square of the supply voltage and decreases in inverse proportion to the resistance. For this reason, the resistance of the heating resistor for holding the thermostat in the off state cannot be made extremely large. In other words, it is difficult to make the battery charging current extremely small after the thermostat has switched off. In making the charging current small to prevent battery over-charging, it is important to make Joule heating of the heating resistor small, but to efficiently heat the thermostat with the heat generated.

If the heating resistor 48, 58 is mounted on the outside the heat sensitive cut-off device 41, 51 which is a thermostat as shown in FIG. 4 and FIG. 5, it is difficult to efficiently transmit Joule heat from the heating resistor to the thermostat. This is because heat radiates away from the periphery of the heating resistor 43 as indicated by the arrows of FIG. 4. It is necessary to design a heating resistor 48 with increased heat generation in a battery pack in which the heating resistor 48 cannot effectively heat the thermostat. Therefore, it is necessary to design the resistance of the heating resistor small and make the current flow large after the thermostat has switched off. This results in the problem of battery over-charging by the current flow when the thermostat is in the off state. And, to avoid over-charging it is extremely important to make the current flow in the heating resistor as small as possible. To achieve this, it is necessary for the heating resistor to effectively heat the heat sensitive cut-off device, and it is necessary to reduce heat radiation away from the heating resistor as much as possible.

Further, in the battery pack shown in FIG. 4 and FIG. 5, the heating resistor is fixed in close contact to the heat sensitive cut-off device which is a thermostat as shown in FIG. 6. Therefore, the external dimensions of the safety device become large and when placed between batteries of the battery pack, the safety device sticks out beyond the battery pack thickness as shown in FIG. 5. A battery pack with one protruding part has the drawback that an extra amount of space must be allotted to hold the batteries.

A further disadvantage of a battery pack with the heating resistor fixed to the outside of the thermostat is that the number of parts, manufacturing steps, and the cost is increased.

The present invention was developed to solve these problems. It is thus a primary object of the present invention to provide a battery pack that can cut-off battery current in extreme situations, maintain the heat sensitive cut-off device in the cut-off state with small current flow, and also miniaturize the internal safety device to reduce volume. The above and further objects of the invention will be more fully apparent from the following detailed description with accompanying drawings.

SUMMARY OF THE INVENTION

The battery pack of this invention comprises a plurality of batteries, an outer shell to house the batteries, a heat sensitive cut-off device connected in series with the batteries to switch to an off state when battery temperature exceeds a set temperature, an inside case to house the heat sensitive cut-off device, and a heating resistor also contained within the inside case. The inside case is mounted in the space enclosed by the batteries and the outer shell, and conducts battery heat to the heat sensitive cut-off device within. The heating resistor is connected in parallel with the heat sensitive cut-off device. Further, the heating resistor is contained in the inside case which also houses the heat sensitive cut-off device. This means the heating resistor is thermally insulated by the double layer of the inside case and the outer shell to reduce heat loss due to radiation to the outside. The heating resistor generates Joule heat due to current that bypasses the heat sensitive cut-off device when it is in the off state. The heating resistor is thermally connected with the heat sensitive cut-off device and is housed within the same inside case. The heating resistor's Joule heating directly heats the heat sensitive cut-off device to hold it in the off state.

In addition, the battery pack of the present invention can preferably contain a forced shut-off resistor as well. The forced shut-off resistor is connected in series with the heat sensitive cut-off device, and generates Joule heat due to the current flowing to the batteries. This heats the heat sensitive cut-off device which is forced to switch to the off state. The forced shut-off resistor is contained within the same inside case as the heat sensitive cut-off device. Both the heating resistor and the forced shut-off resistor, which are housed in the same inside case with the heat sensitive cut-off device, provide Joule heating of the heat sensitive cut-off device. The forced shut-off resistor can heat a heat sensitive cut-off device in the on state and switch it to the off state when excessive current flows to the batteries.

DETAILED DESCRIPTION OF THE INVENTION

The battery pack of the present invention is provided with an inside case mounted within an enclosure surrounded by batteries and an outside shell. The inside case contains a heat sensitive cut-off device and a heating resistor, and the heating resistor is doubly covered with respect to thermal insulation. The heating resistor is covered by both the outside shell and the inside case. This reduces heat radiation away from the heating resistor and allows efficient transfer of heat generated by the heating resistor to the heat sensitive cut-off device. Further, with the heating resistor housed together with the heat sensitive cut-off device within the inside case, the heat sensitive cut-off device can be directly heated by Joule heating of the heating resistor. This is because the inside case is disposed around but not between the heating resistor and the heat sensitive cut-off device. In a battery pack with this structure, heat conduction within the inside case from the heating resistor to the heat sensitive cut-off device is improved, and heat dissipation through radiation is reduced by the double thermal covering of the outside shell and the inside case.

In a battery pack with efficient heating of the heat sensitive cut-off device by Joule heating of the heating resistor, the flow of charging current to the battery when the heat sensitive cut-off device is in the off state can be reduced. There is no requirement for excess Joule heating by the heating resistor when heat transfer from the heating resistor to the heat sensitive cut-off device occurs without leakage. Therefore, the resistance of the heating resistor can be set to a high value to reduce charging current and prevent overcharging when the heat sensitive cut-off device is in the off state.

Figure 1A:
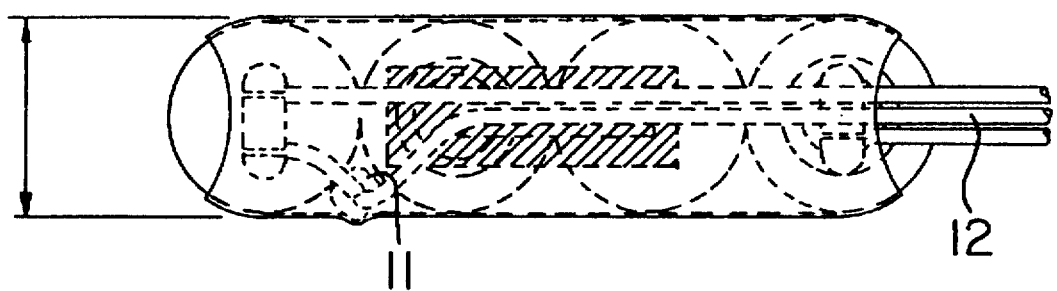
FIGS. 1A–1B is a side view and plan view showing an example of a prior art battery pack.
Figure 1B:
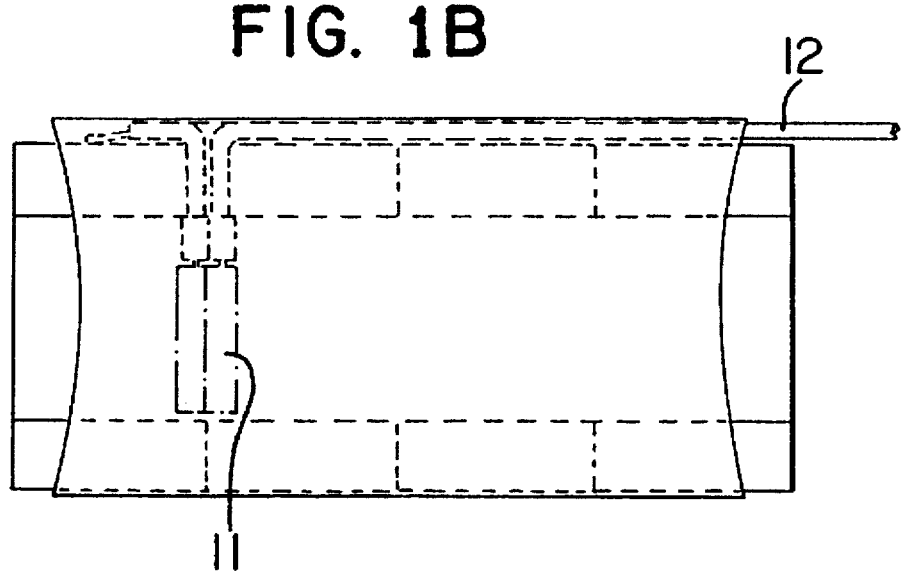
Figure 2:
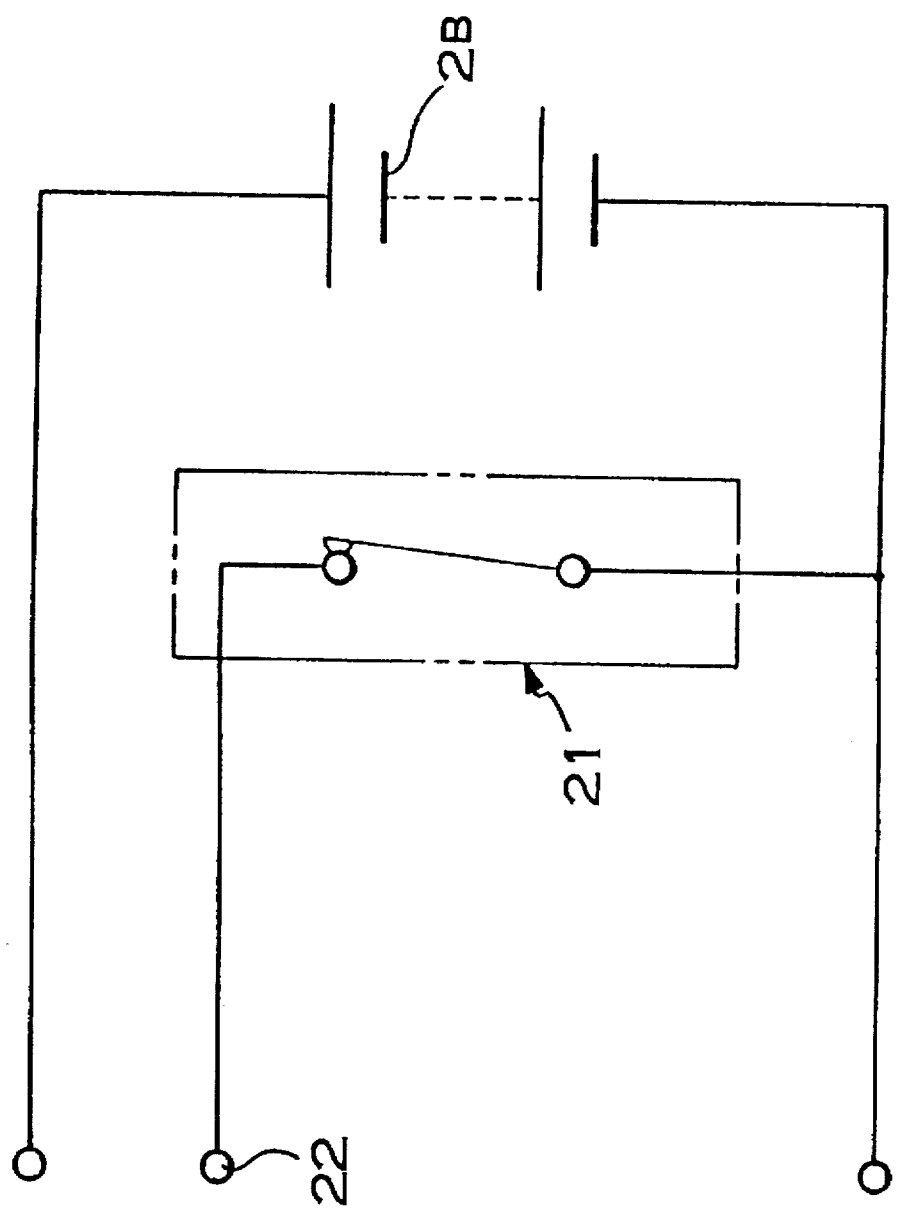
FIG. 2 is a circuit diagram of the battery pack shown in FIG. 1.
Figure 3:
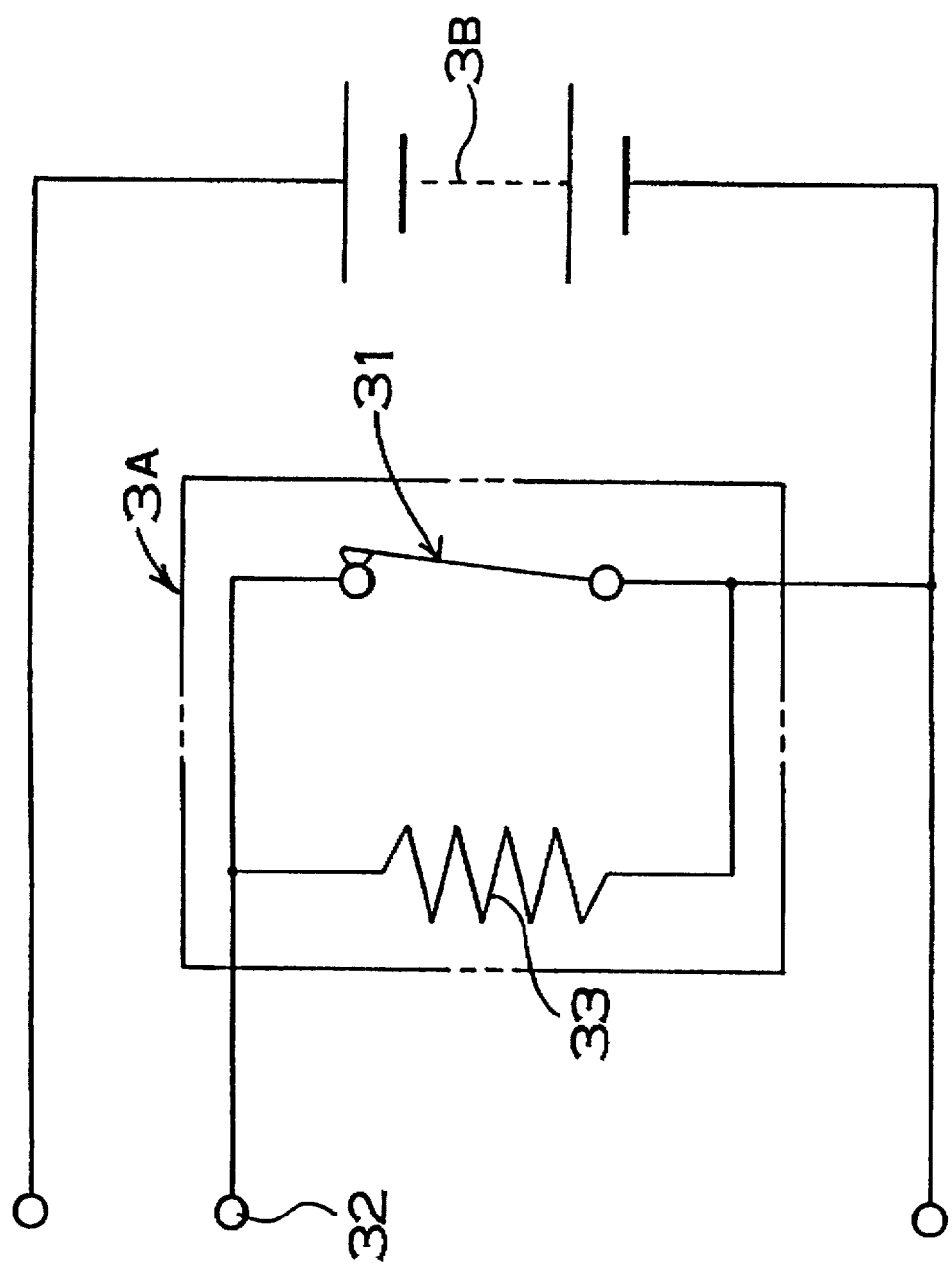
FIG. 3 is a circuit diagram of another example of a prior art battery pack.
Figure 4:
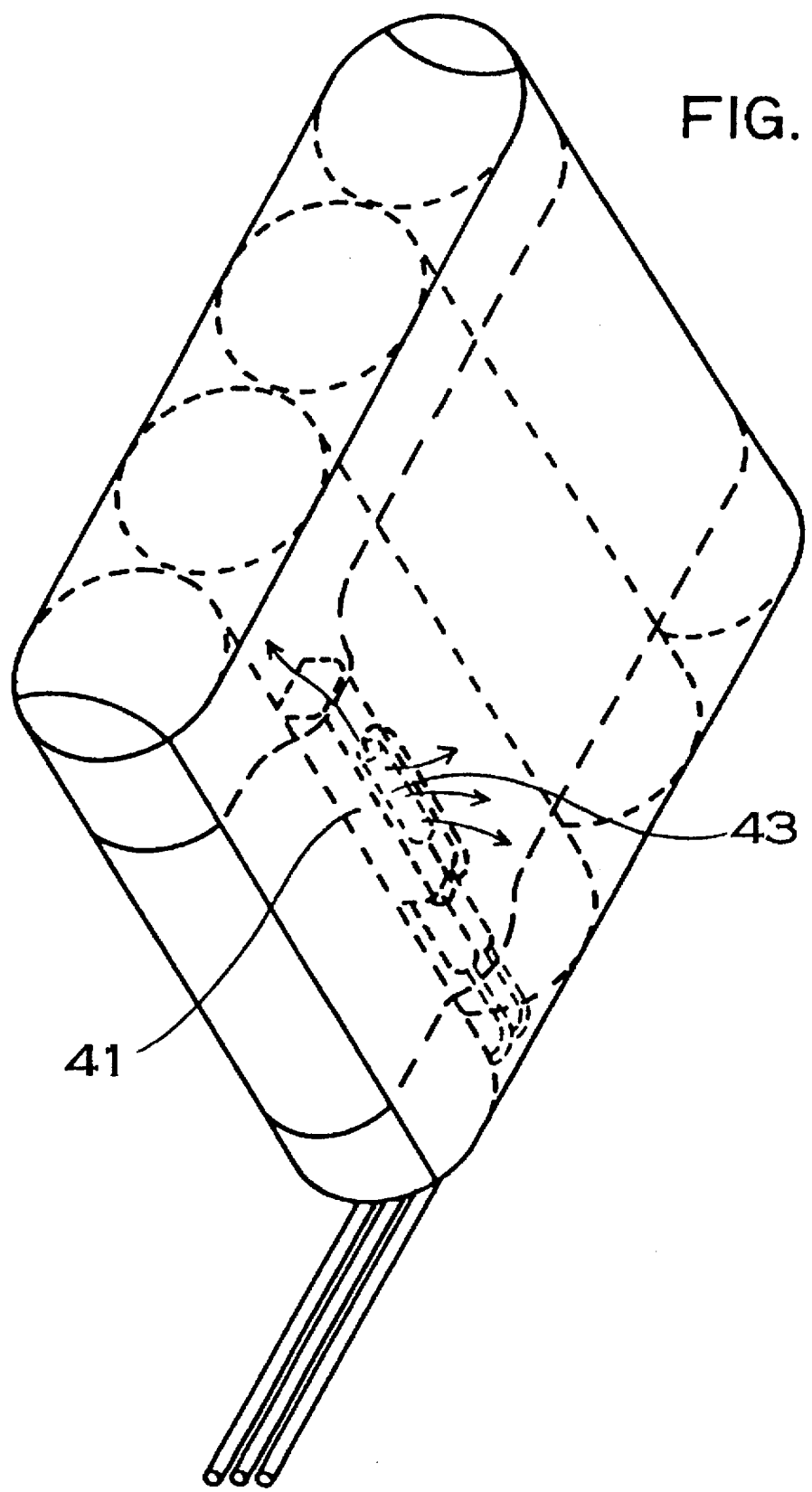
FIG. 4 is an oblique view of a battery pack with the circuit structure shown in FIG. 3.
Figure 5A:
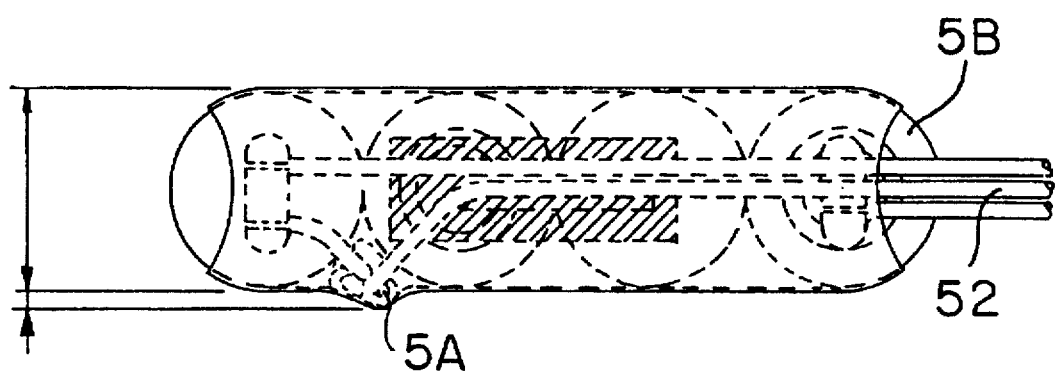
FIGS 5A–5B is a side view and plan view of a battery pack with the circuit structure shown in FIG. 3.
Figure 5B:
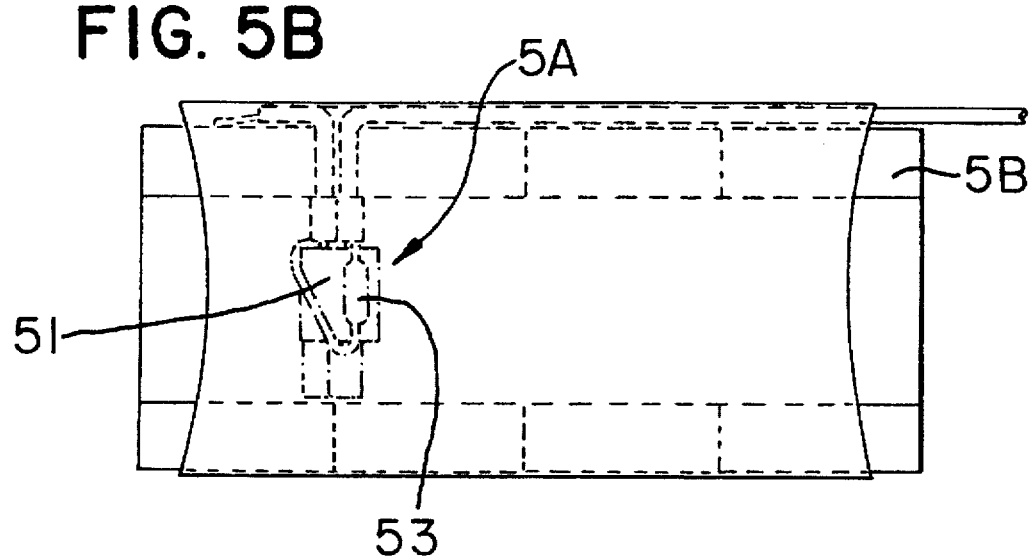
Figure 6A:
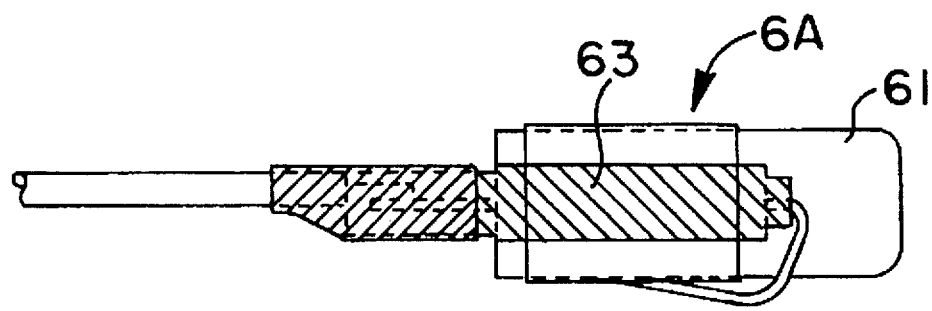
FIGS. 6A, 6B, 6C is a plan view, front view, and bottom view of the safety device contained in the battery pack shown in FIG. 3.
Figure 6B:
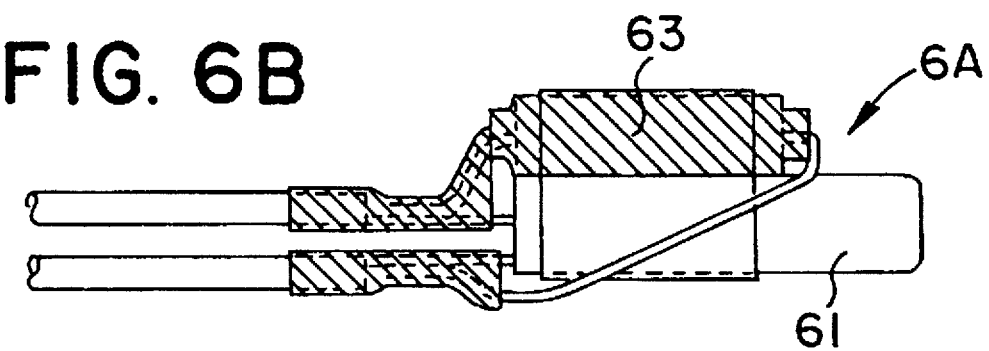
Figure 6C:
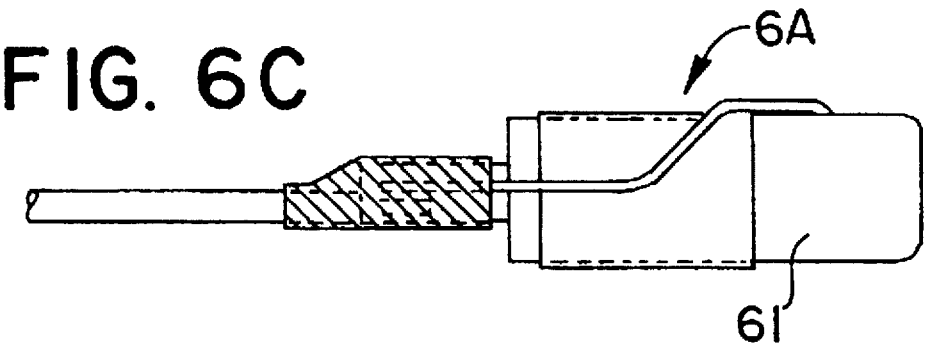
Figure 7A:
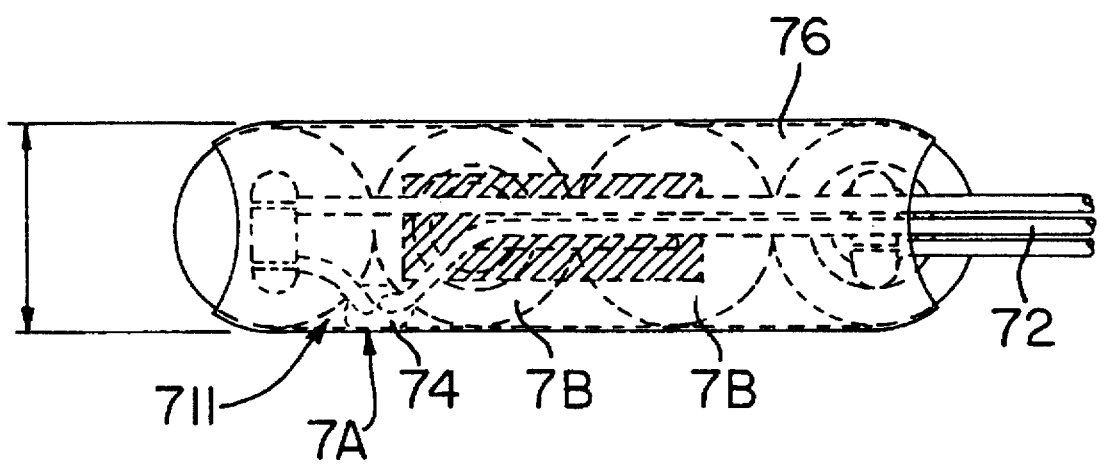
FIGS. 7A–7B is a side view and plan view of an embodiment of the battery pack of the present invention.
Figure 7B:
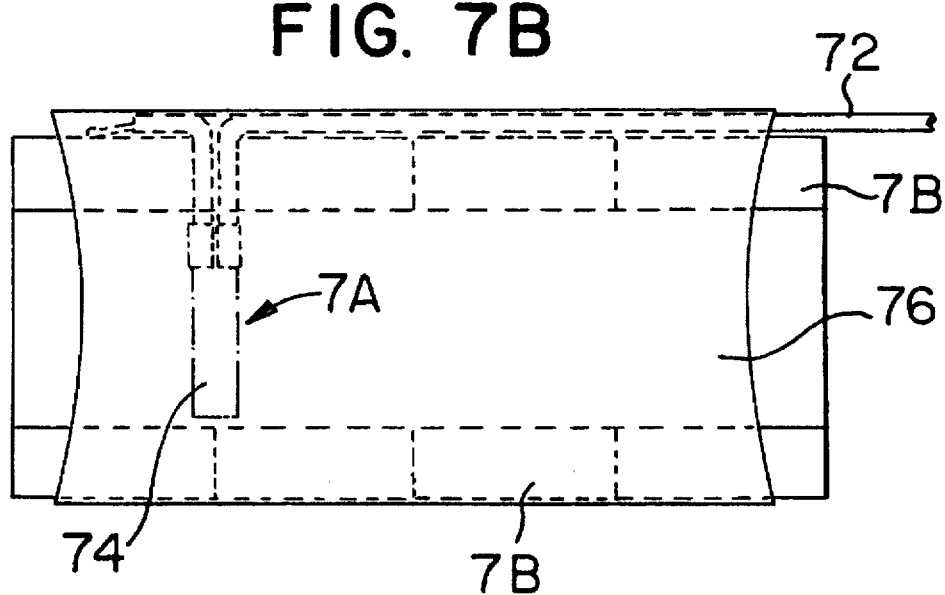

Turning to the battery pack shown in FIG. 7, cylindrical batteries 7B are aligned and connected in a row of four and the battery surfaces are covered by an outside shell of heat-shrink tubing. The external dimensions of a battery pack with an outside shell of heat-shrink tubing can be made small because the tubing is thin. However, although not illustrated, the battery pack of this invention may also have an outside shell formed with plastic. A plastic outside shell is formed in a box shape to contain a plurality of batteries.

Figure 8:
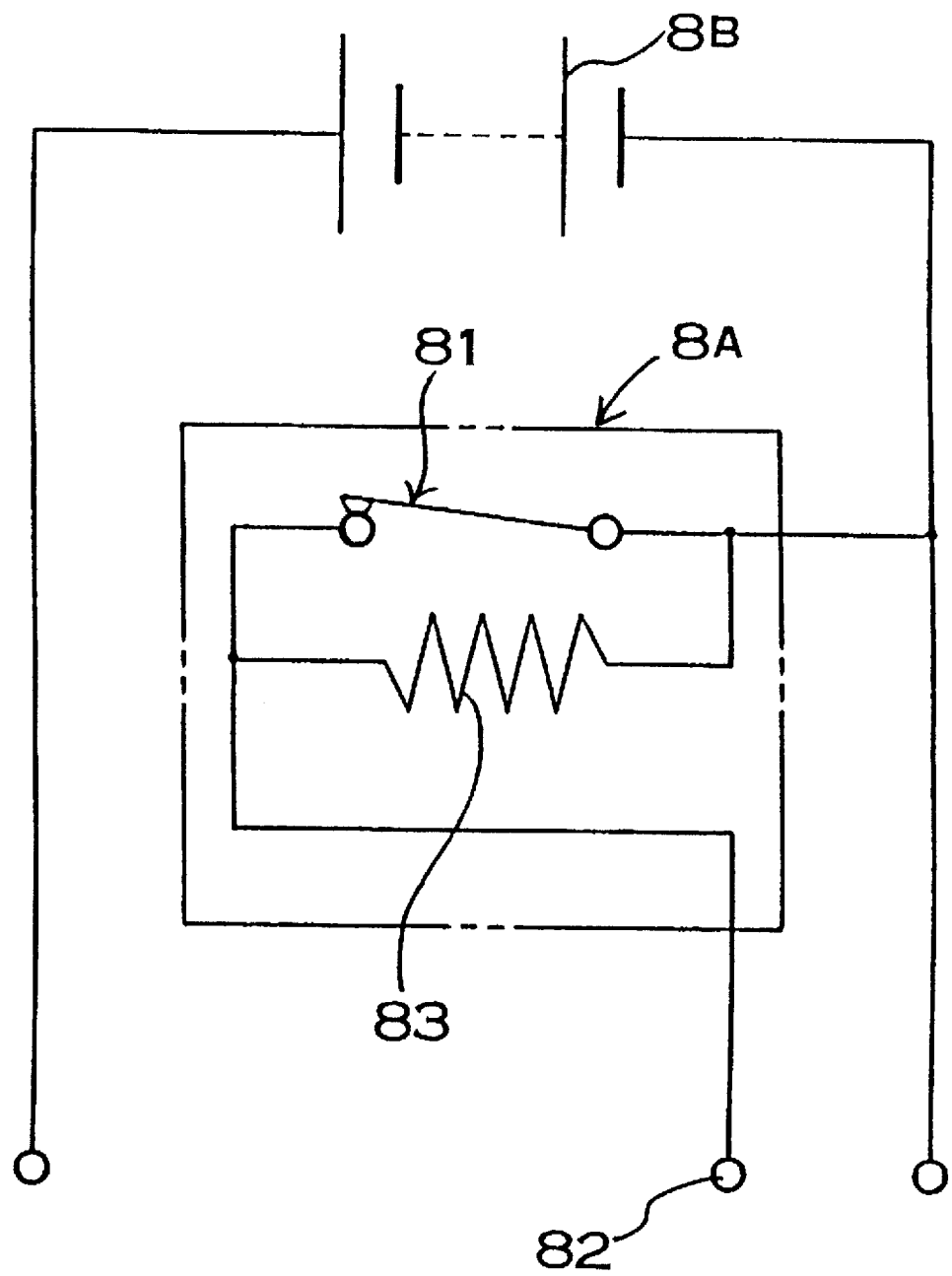
FIG. 8 is a circuit diagram of the battery pack of FIG. 7.

The battery pack of FIG. 7 is provided with a safety device 7A disposed within the enclosed trough-like region 711 formed between the outside shell 76 and the batteries 7B. The safety device 7A comprises the heat sensitive cut-off device and the heating resistor housed together within the inside case 74. The heating resistor housed along with the heat sensitive cut-off device in the inside case 74 is thermally covered by both the outside shell 76 and the inside case 74 to effectively prevent radiative heat dissipation. The circuit diagram corresponding to the battery pack of FIG. 7 is shown in FIG. 8. In the battery pack of this circuit diagram, the heat sensitive cut-off device 81 housed within the inside case is connected in series with the batteries 8B between the batteries 8B and the charging terminal 82. The safety device 8A, which is connected to the charging terminal 82, stops charging when battery 8B temperature rises abnormally switching the heat sensitive cut-off device 81 to the off state. To prevent excessive current flow during battery discharge, a safety device is connected in series with the batteries between the batteries and the discharge terminal.

As shown in FIG. 8, the heating resistor 83, which is housed together with the heat sensitive cut-off device 81 in the inside case, is connected in parallel with the heat sensitive cut-off device 81. The heating resistor 83 prevents the heat sensitive cut-off device 81 from returning to the on state once it has been activated to the off state. The heating resistor 83 maintains the heat sensitive cut-off device 81 in the off state by Joule heating.

Figure 9:
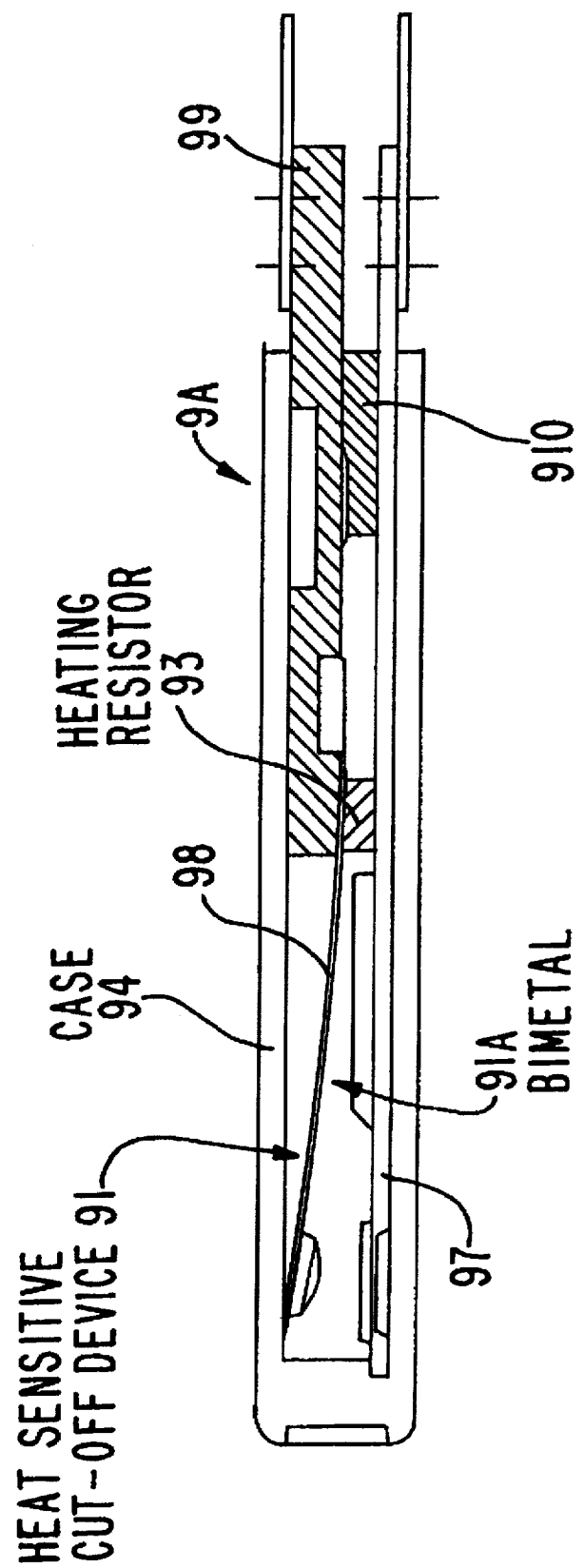
FIG. 9 is a cross sectional view of the safety device contained in a battery pack having the circuit diagram shown in FIG. 8.
Figure 10:
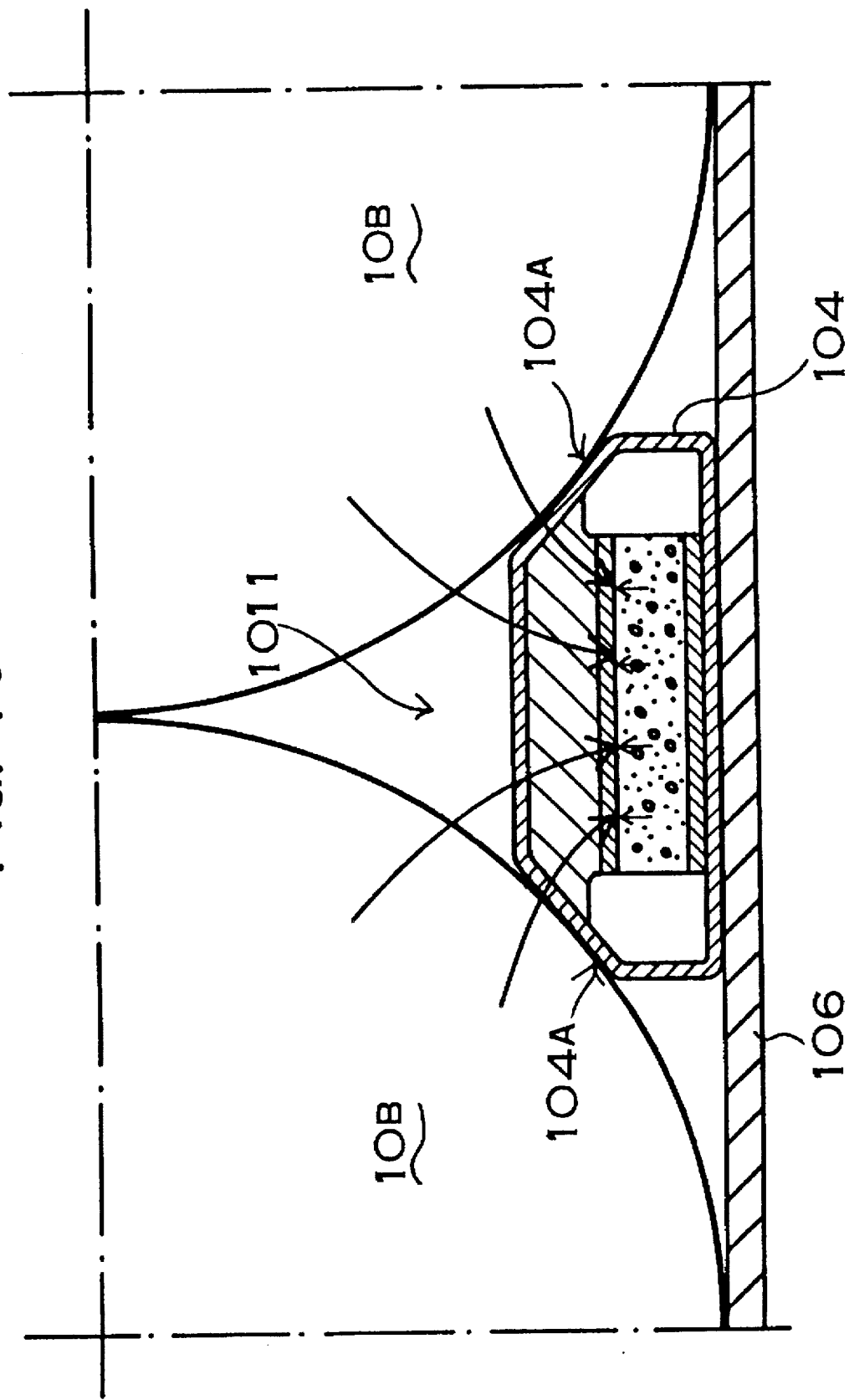
FIG. 10 is an enlarged lateral cross sectional view of the installed safety device showing part of the battery pack.

Turning to FIG. 9, the cross sectional structure of the safety device 9A is shown. The safety device 9A of this figure uses bimetal 91A in the heat sensitive cut-off device 91. The inside case 94 contains the heating resistor 93 held in direct contact with the bimetal 91. The inside case 94 of the safety device 9A shown in this figure is formed plastic. The plastic inside case 94 is formed in a tubular shape closed at the left end and open at the right end in FIG. 9. As shown in the lateral cross section of FIG. 10, the inside case is disposed in an enclosed trough-like region 1011 between cylindrical batteries 10B. Further, the inside case is provided with slanting surfaces 104A on both sides to allow surface contact with the batteries 10B over a large area. FIG. 10 is an enlarged lateral cross section of the region showing the inside case 104 mounted in the enclosure 1011 between the batteries 10B and the outside shell 106. As shown by the arrows in FIG. 10, heat generated by the batteries 10B is effectively transmitted to the inside case 104, which is close to, or in intimate contact with battery surfaces. Finally, the inside case shown in FIG. 10 has its bottom surface formed in a plane which does not project out from the outside shell of the battery pack.

The inside case 94 of FIG. 9 has a fixed contact 97 disposed inside its bottom surface. The right end of the fixed contact 97 projects out from the inside case 94. The movable contact 98 of the bimetal 91A has its right end fixed within the inside case 94 and its left end positioned to allow its movement within the inside case 94. The electrical contact between the left end of the movable contact 98 and the left end of the fixed contact 97 is fixed within the inside case 94. The right end of the movable contact 98 is fixed within the inside case 94 by being sandwiched on one side by the heating resistor 93 and insulating material 910. The movable contact 98 of the bimetal 91A is connected to a lead strip 99 which projects out from the right end of the inside case 94. The opening at the right end of the inside case 94, from which the lead strip 99 and fixed contact 97 project, is also closed off with insulating material 910.

The movable contact 98 of the bimetal 91A is normally in contact with the fixed contact 97 resulting in the on state. However, when heated above a set temperature, the movable contact 98 moves to open the contact establishing the off state. The heating resistor 93 which maintains the bimetal heat sensitive cut-off device 91 in the off state is positioned between the contacts of the bimetal 91A. The heating resistor 93 has a resistance that has been adjusted by the amount of carbon impregnated in the binder material of the resistor. However, thin high resistance wire such as nichrome can also be used for the heating resistor. The resistance of the heating resistor is designed small enough to allow Joule heating to hold the bimetal in the off state and large enough to establish a current that will not over-charge the batteries. The disposition of the heating resistor 93 between the bimetal 91A contacts, as shown in FIG. 9, allows the most efficient heating of the bimetal 91A by the heating resistor 93.

The safety device of FIG. 9 has the right end of its inside case 94 closed off by the fixed contact 97, the insulating material 910, and the lead strip 99. A battery pack with this closed off inside case that houses both the heat sensitive cut-off device and the heating resistor, has the feature that heat radiation away from the inside case is effectively prevented and the heat sensitive cut-off device is efficiently heated by the heating resistor. This is because the air within the inside case does not circulate to the outside. However, it is not always necessary for the inside case to be an air-tight structure. Even allowing some leakage due to heating and expansion of air within the inside case, the system is sufficiently restricted from ventilation and heat radiation away from the heating resistor is effectively prevented. Clearly, however, the inside case may also have an air-tight structure with no leakage. A completely air-tight inside case must be designed with sufficient strength to avoid rupture due high pressure air inside resulting from temperature rise and heat expansion.

If the inside case, which is mounted within an enclosed region of the battery pack, is made of plastic, it has insulating properties. An insulating plastic inside case can be put in direct contact with the external case of a battery, and the internal contacts and lead strip may be in contact with the enclosing case. However, in the battery pack of this invention, the inside case is not necessarily specified to be plastic. The inside case may also be made of metal. However, a metal inside case must contact a battery case through insulating material, and the internal contacts and lead strip must be disposed through insulating material within the inside case. A metal inside case is characterized by exceptional heat conduction.

Figure 11:
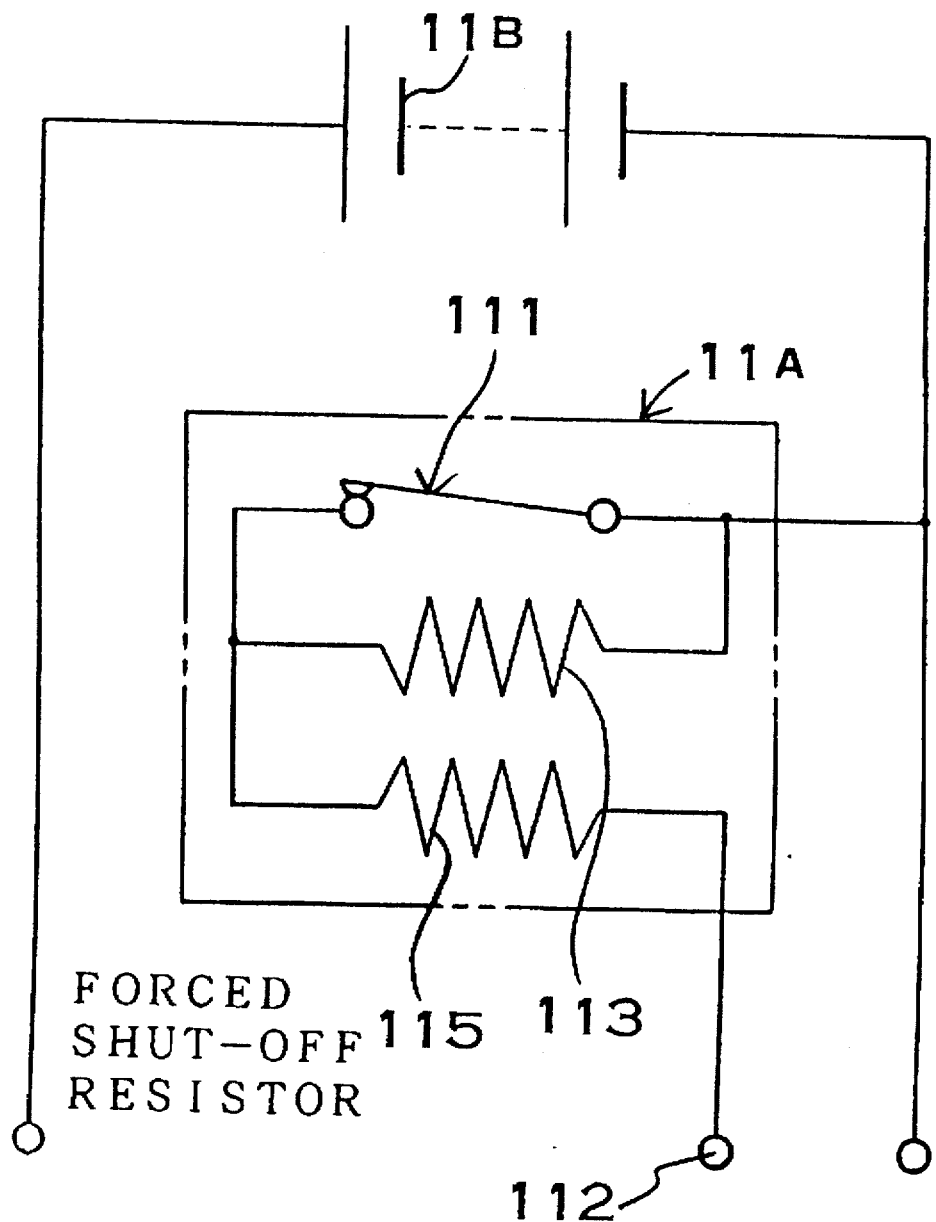
FIG. 11 is a circuit diagram of another embodiment of the battery pack of the present invention.
Figure 12:
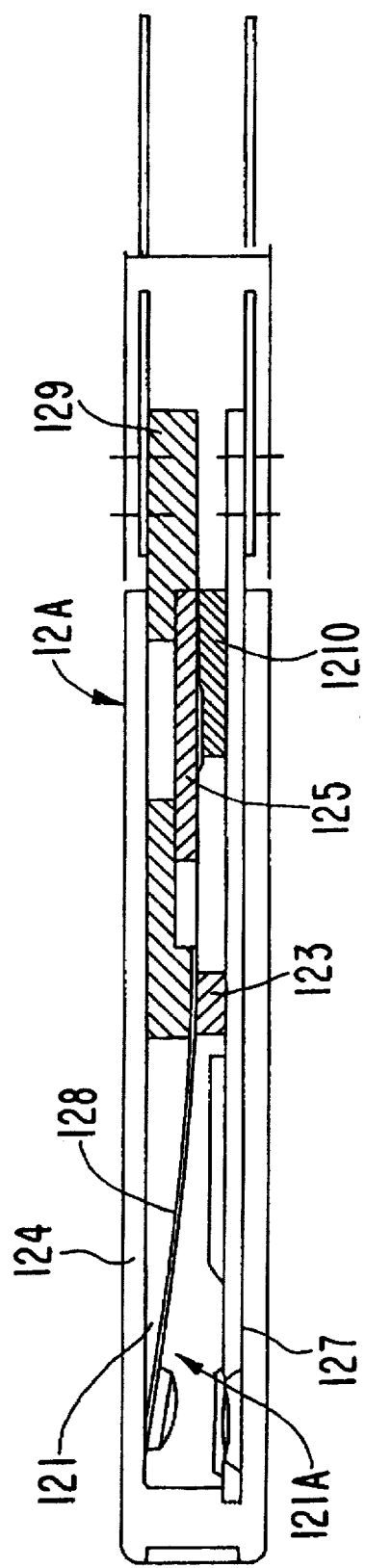
FIG. 12 is a cross sectional view of the safety device contained in a battery pack having the circuit diagram shown in FIG. 11.

Turning to the battery pack shown in FIG. 11, a forced shut-off resistor 115 is connected in series with the heat sensitive cut-off device 111. A safety device 11A containing a forced shut-off resistor 115 is mounted within the enclosure between the batteries and the outside shell in the same fashion as the battery packs previously shown in FIG. 7 and FIG. 10. As shown in FIG. 12, the forced shut-off resistor 125 is connected in series with the heat sensitive cut-off device 121, which is bimetal 121A, and is contained together with the heat sensitive cut-off device 121 and the heating resistor 123 within the inside case 124. The forced shut-off resistor 125 heats the bimetal 121A by Joule heating to force it to switch to the off state. When excessive current flows to the batteries, it also flows through the forced shut-off resistor 125 producing Joule heat. The heat sensitive cut-off device, which is bimetal 121A, is heated by this Joule heating and turns off. In this safety device 12A, the bimetal 121A is heated by battery 12B current. Consequently, a battery pack containing this safety device 12A has the feature that the bimetal 121A switches off to protect the batteries when excessive current flows through the batteries.

Efficient heating of the bimetal 121A by the forced shut-off resistor 125 is insured by connecting it in series between the movable contact 128 and the lead strip 129. This allows Joule heating of the bimetal 121A movable contact 128. A voltage drop results from current flow through the forced shut-off resistor 125. Therefore, the resistance of the forced shut-off resistor 125 is made as small as possible. However, if the resistance of the forced shut-off resistor 125 is made too small, its Joule heating will also be small making it unable to effectively heat the bimetal. The resistance of the forced shut-off resistor 125 is optimized considering battery capacity, voltage drop, and the amount of Joule heating required.

In the safety device 12A shown in FIG. 12, the forced shut-off resistor 125 is positioned between the lead strip 129 and the bimetal 121A movable contact 128 of the heat sensitive cut-off device 121. As for the heating resistor 123, carbon filled binder or resistive wire is used for the forced shut-off resistor 125. In the safety device 12A of FIG. 12, the forced shut-off resistor 125 is in direct contact with the bimetal 121A. This configuration insures effective conduction of Joule heat from the forced shut-off resistor 125 to the bimetal 121A.

A battery pack containing a safety device configured as shown in FIG. 12 efficiently transfers heat from the forced shut-off resistor 125 to the heat sensitive cut-off device 121 allowing rapid switching to the off state. Consequently, this type of battery pack has the feature that when excessive battery current flows, such as when a battery is short circuited, the heat sensitive cut-off device is activated to cut-off battery current to protect the batteries.

The forced shut-off resistor can effectively heat the heat sensitive cut-off device because it, together with the heating resistor, are thermally doubly covered by the outside shell and the inside case. Therefore, the resistance of the forced shut-off resistor can be small, and heat sensitive cut-off device activation time can be short. This reduces loss due to voltage drop across the forced shut-off resistor in addition to achieving reliable activation of the heat sensitive cut-off device.

Figure 13:
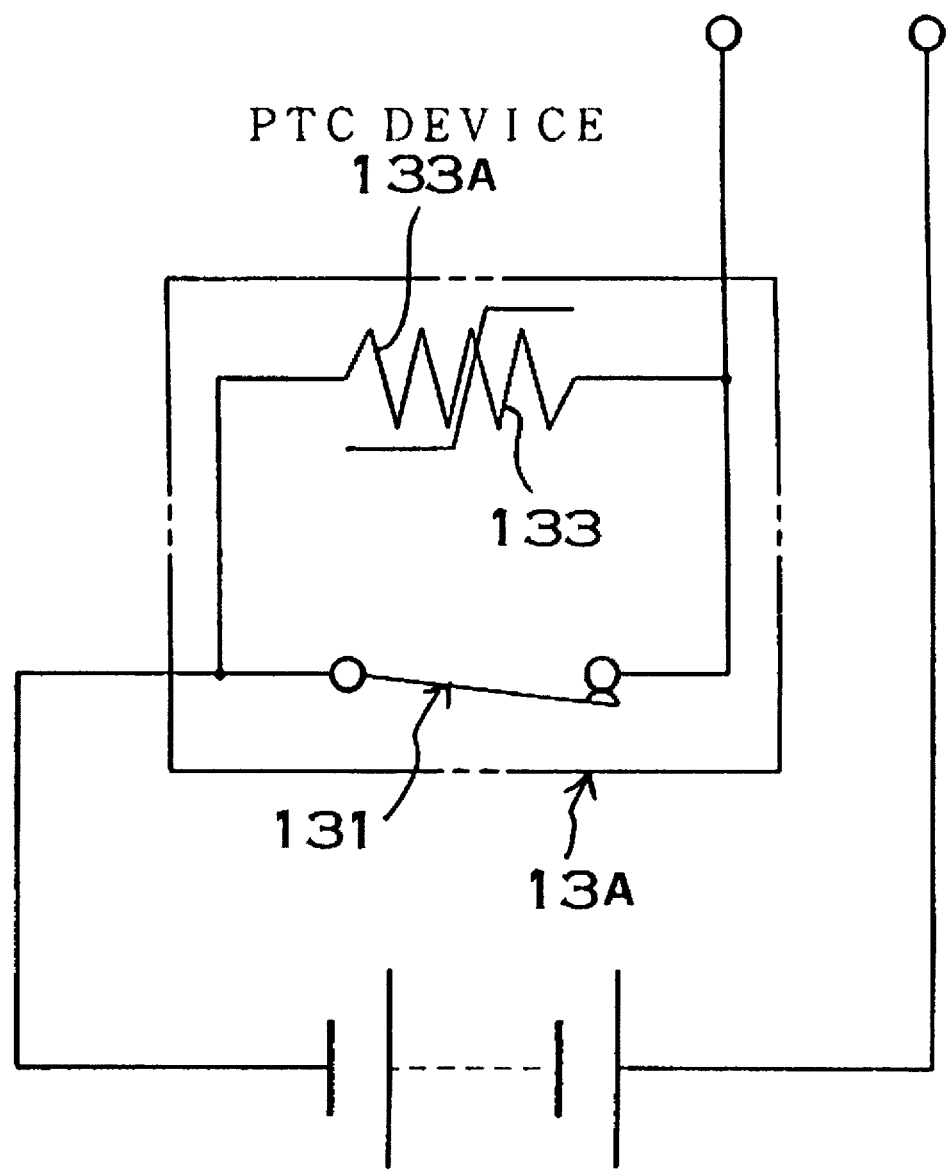
FIG. 13 is a circuit diagram of still another embodiment of the battery pack of the present invention.

Finally turning to the battery pack shown in FIG. 13, the heating resistor 133 is a PTC device 133A. Referring to the cross section of FIG. 9, the heating resistor 93 is a PTC device. The PTC device 133A is a device that increases resistance rapidly as temperature is increased. Consequently, when the bimetal heat sensitive cut-off device 131 reaches its activation temperature, the PTC device 133A has also increased in resistance. When the bimetal activates switching to the off state, considerable Joule heating results from current now flowing through the PTC device. This heats the bimetal holding it in the off state. When the bimetal is not activated and in the on state, PTC device resistance is extremely low. Therefore, when the bimetal contact is closed in the on state, battery current flows through the parallel combination of both the bimetal and the PTC device. Since the resistance of the closed bimetal contact is much lower than that of the PTC device, most of the current flows through the bimetal contact. However, if the resistance of the bimetal increases due to a problem such as contact resistance, battery current will bypass through the PTC device. This system has the feature that the battery pack can still be used even with a bimetal contact problem.

In a battery pack provided with an inside case housing both a bimetal and a PTC device as described above, PTC device resistance becomes extremely large generating significant Joule heating for a given current when the bimetal reaches its activation temperature. This effect in synergy with positioning the PTC device between the bimetal contacts results in extremely effective bimetal heating. Consequently, this system has the feature that the bimetal contact is effectively prevented from returning to the on state by a small current flow through the PTC device.

In the above embodiments, the heating resistor and forced shut-off resistor are housed in the same inside case in direct contact with the heat sensitive cut-off device. This type of safety device results in the most effective transfer of Joule heat from the heating resistor and the forced shut-off resistor to the heat sensitive cut-off device. However, the battery pack of the present invention does not necessarily require that the heating resistor and the forced shut-off resistor always be fixed in direct contact with the heat sensitive cut-off device. For example, although it is not illustrated, the heating resistor or forced shut-off resistor and the heat sensitive cut-off device may be in close proximity with a heat conducting material such as metal or plastic attached between them to conduct Joule heat to the heat sensitive cut-off device.

As this invention may be embodied in several forms without departing from the spirit or essential characteristics thereof, the present embodiments are therefore illustrative and not restrictive since the scope of the invention is defined by the appended claims rather than by descriptions preceding them, and all changes that fall within the meets and bounds of the claims, or equivalence of such meets and bounds thereof are therefore intended to be embraced by the claims.

What is claimed is:

1. A battery pack comprising:
   (a) at least first and second cylindrical batteries, said first and second cylindrical batteries extending side by side and contacting each other in a lengthwise direction;
   (b) an outside shell that contains said first and second batteries so as to define within said outside shell a generally triangular elongate trough having walls defined by said first and second cylindrical batteries and said outside shell;
   (c) a heat sensitive cut-off device electrically connected in series with said first and second cylindrical batteries that switches to an off state when a battery temperature exceeds a set temperature;
   (d) an elongate inside case, contained lengthwise within said elongate trough, which contains said heat sensitive cut-off device, and which conducts heat from said first and second cylindrical batteries to said heat sensitive cut-off device contained therein; and
   (e) a heating resistor, electrically connected in parallel with said heat sensitive cut-off device and contained within said inside case so as to be covered by both said inside case and said outside shell for double thermal insulation, said heating resistor being thermally connected to said heat sensitive cut-off device such that Joule heat generated by current passing through said heating resistor and bypassing said heat sensitive cut-off device when said heat sensitive cut-off device is in the off state is used to heat said heat sensitive cut-off device and hold said heat sensitive cut-off device in the off state;
   (f) a forced shut-off resistor, electrically connected in series with said heat sensitive cut-off device and contained within said inside case so as to be covered by both said inside case and said outside shell for double thermal insulation, which forces said heat sensitive cut-off device to switch off by generating Joule heat due to current flow to said batteries;
   wherein said elongate inside case includes first and second inclined outer walls substantially conforming to and contacting surfaces of said first and second cylindrical batteries, respectively, lengthwise within said elongate trough;
   wherein said inside case is a closed structure and further includes a flat bottom wall conforming to and contacting a flat surface of said outer shell; and
   wherein said inside case is made of plastic.

2. A battery pack as recited in claim 1, wherein said outside shell is formed of plastic.

3. A battery pack as recited in claim 1, wherein said heat sensitive cut-off device is a bimetal.

4. A battery pack as recited in claim 3, wherein said heating resistor is mounted between bimetal contacts.

5. A battery pack as recited in claim 1, wherein said heating resistor is a PTC device.

6. A battery pack as recited in claim 1, wherein said forced shut-off resistor is contained within said inside case so as to contact directly said heat sensitive cut-off device.

7. A battery pack as claimed in claim 1, wherein said outside shell is a heat-shrink tubing.

* * * * *